(12) United States Patent  (10) Patent No.: US 8,475,061 B2
Linnen et al.  (45) Date of Patent: Jul. 2, 2013

(54) MEMBRANE SUSPENDED OPTICAL ELEMENTS, AND ASSOCIATED METHODS

(75) Inventors: Christopher J. Linnen, Erie, CO (US); Regis S. Fan, Westminster, CO (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 12/863,416

(22) PCT Filed: Jan. 16, 2009

(86) PCT No.: PCT/US2009/031283
§ 371 (c)(1),
(2), (4) Date: Feb. 17, 2011

(87) PCT Pub. No.: WO2009/092000
PCT Pub. Date: Jul. 23, 2009

(65) Prior Publication Data
US 2011/0134555 A1   Jun. 9, 2011

Related U.S. Application Data

(60) Provisional application No. 61/021,338, filed on Jan. 16, 2008.

(51) Int. Cl.
*G03B 17/00* (2006.01)
(52) U.S. Cl.
USPC .......................................................... 396/439
(58) Field of Classification Search
USPC .......................................................... 396/439
See application file for complete search history.

(56) References Cited

U.S. PATENT DOCUMENTS

| 4,154,506 | A |  | 5/1979 | Yevick |
| 6,124,974 | A | * | 9/2000 | Burger .......................... 359/621 |
| 6,178,033 | B1 |  | 1/2001 | Ford et al. |
| 6,381,072 | B1 | * | 4/2002 | Burger .......................... 359/622 |
| 7,663,083 | B2 | * | 2/2010 | Kwon et al. ................ 250/208.1 |
| 7,925,154 | B2 | * | 4/2011 | Ryu .............................. 396/268 |
| 2005/0035474 | A1 | * | 2/2005 | Itoh .............................. 264/1.38 |
| 2005/0275946 | A1 | * | 12/2005 | Choo et al. ...................... 359/619 |
| 2006/0186492 | A1 | * | 8/2006 | Boettiger et al. ............. 257/414 |
| 2009/0046144 | A1 | * | 2/2009 | Tuttle .............................. 348/61 |
| 2010/0165134 | A1 | * | 7/2010 | Dowski et al. ............. 348/218.1 |

FOREIGN PATENT DOCUMENTS

| EP | 0550022 A | 7/1993 |
| EP | 1251365 A1 | 10/2002 |
| EP | 1443754 A2 | 8/2004 |
| EP | 1837168 A1 | 9/2007 |
| JP | 2005294347 A | 1/2001 |
| WO | 0233469 A | 4/2002 |

OTHER PUBLICATIONS

International Search Report and Written Opinion in related PCT Patent Application Serial No. PCT/US2009/031283, dated Apr. 30, 2009, 16 pages.
Office Action in related European Patent Application 09702508.4, dated Aug. 9, 2012, 5 pages.

* cited by examiner

*Primary Examiner* — Rodney Fuller
(74) *Attorney, Agent, or Firm* — Lathrop & Gage LLP

(57) ABSTRACT

Membrane suspended optical elements include a structured substrate including a plurality of apertures defined therein and an array of optical elements, each of the optical elements being suspended by membrane within one of the apertures.

16 Claims, 12 Drawing Sheets

MEMBRANE SUSPENDED OPTICAL ELEMENTS, AND ASSOCIATED METHODS

CROSS-REFERENCE TO RELATED APPLICATIONS

This application claims priority to U.S. Provisional Application No. 61/021,338, filed 16 Jan. 2008 and incorporated herein by reference.

BACKGROUND

In the fabrication of wafer-scale miniature camera systems, a plurality of optical elements are fabricated as, for example, an array on a face of a substrate, such as an 8-inch or 12-inch substrate. Examples of such optical elements include refractive optical elements, diffractive optical elements, reflective elements, gradient index (GRIN) elements, subwavelength optical structures, antireflection coatings and filters. Such plurality of optical elements are formed directly on a substrate or, alternatively, replicated from a master substrate, on which features defining the plurality of optical elements have been formed. For instance, as described in International Patent Application number PCT/US07/09347 (incorporated herein by reference), a precision-machined, fabrication master can be used to mold a plurality of optical elements using a polymeric material on a common support. The precision machined, fabrication master is formed of a solid yet machinable material such as brass, aluminum, polymethylmethacrylate ("PMMA") or another metal or polymer. Additionally, one or more fiducial marks and/or alignment features can be fabricated onto the precision-machined, fabrication master along with the features defining the plurality of optical elements so as to maintain a high degree of accuracy in the positioning of the fiducial marks and/or alignment features with respect to the features defining the plurality of optical elements.

FIG. 1 shows an exemplary fabrication master 100, including a plurality of features 110 for defining optical elements therewith. Fabrication master 100 also includes a plurality of alignment features 120 for facilitating alignment between fabrication master 100 and a second object, such as a vacuum chuck or substrate. Fabrication master 100 can be used in a process to form an array 200 of optical elements 210 on a common base 225, such as shown in FIG. 2.

Several fabrication masters can be used sequentially in order to form layered optical elements on a substrate, such as shown in FIG. 3. FIG. 3 shows an array 300 including a plurality of layered optical elements 310. Each layered optical element 310 includes several layers of material shaped using precision-machined, fabrication masters that define surface contours.

An exemplary method of forming such layered optical element arrays is illustrated in FIGS. 4-6. As shown in FIG. 4, a common base 410 is secured onto a vacuum chuck 420 including a v-groove 422, which facilitates alignment between vacuum chuck 420 and a first fabrication master 430 including convex alignment features 432. First fabrication master 430 also includes a plurality of features 434 for defining first optical elements therewith. A first material 440 is disposed between common base 410 and first fabrication master 430 such that a surface of first material 440 conforms to one of plurality of features 434. First material 440 is hardened by an appropriate mechanism, such as UV curing or thermal curing.

Then, as shown in FIG. 5, first fabrication master 430 is removed and replaced with a second fabrication master 530 including convex alignment features 532 and plurality of features 534 for defining second optical elements therewith. A second material 540 is disposed between hardened first material 440 and second fabrication master 530, and then hardened. This process is repeated, as shown in FIG. 6, by removing and replacing second fabrication master 530 with a third fabrication master 630, including convex alignment features 632 and plurality of features 634 for defining third optical elements therewith. A third material 640 is disposed between hardened second material 540 and third fabrication master 630, and then hardened. The process may be repeated as many times as needed to achieve the desired layering of optical elements, such as that shown in FIG. 3.

SUMMARY

In an embodiment, membrane suspended optical elements include (a) a structured substrate including a plurality of apertures defined therein; and (b) an array of first optical elements, each of the first optical elements being suspended by membrane within one of the apertures.

In an embodiment, a suspended lens includes a membrane formed of a cured optical material and suspended within an aperture of a substrate, and an optical element formed of the cured optical material and supported by the membrane within the aperture of the substrate.

In an embodiment, a process forms a suspended lens, comprising: engaging a first fabrication pedestal with a substrate that forms at least one aperture; depositing first optical material onto the first fabrication pedestal and within the aperture; engaging a second fabrication pedestal with the substrate such that the first optical material is shaped within the aperture; and curing the first optical material to form a first solid optical element suspended by membrane within the aperture.

In an embodiment, a fabrication pedestal includes: first monolithic structure having a protrusion with first cross-sectional dimension and a shoulder with second cross-sectional dimension that is larger than the first cross-sectional dimension, the protrusion forming, at its distal end, a membrane engagement surface and an optical contour surface, the shoulder forming a substrate engagement surface that is parallel to the membrane engagement surface, wherein positioning the protrusion with an aperture of a substrate while engaging the substrate to the substrate engagement surface permits deposition onto, and subsequent curing of, optical material on the membrane engagement surface and optical contour surface.

In an embodiment, membrane suspended optical elements include: a first structured substrate including a plurality of first apertures defined therein; an array of first optical elements, each of the first optical elements being suspended by membrane within one of the first apertures; a second structured substrate including a plurality of second apertures defined therein; an array of second optical elements, each of the first optical elements being suspended by membrane within one of the second apertures; the first and second substrates being mechanically coupled together, the first and second optical elements being optically aligned.

DETAILED DESCRIPTION OF ILLUSTRATED EMBODIMENTS

One available type of common base is a structured substrate, which is commonly referred to as a spacer wafer. A structured substrate, within the context of the present disclosure, is understood to be a common base formed of, for instance, glass, silicon or sapphire, and includes a plurality of apertures defined therein.

Figure 19:
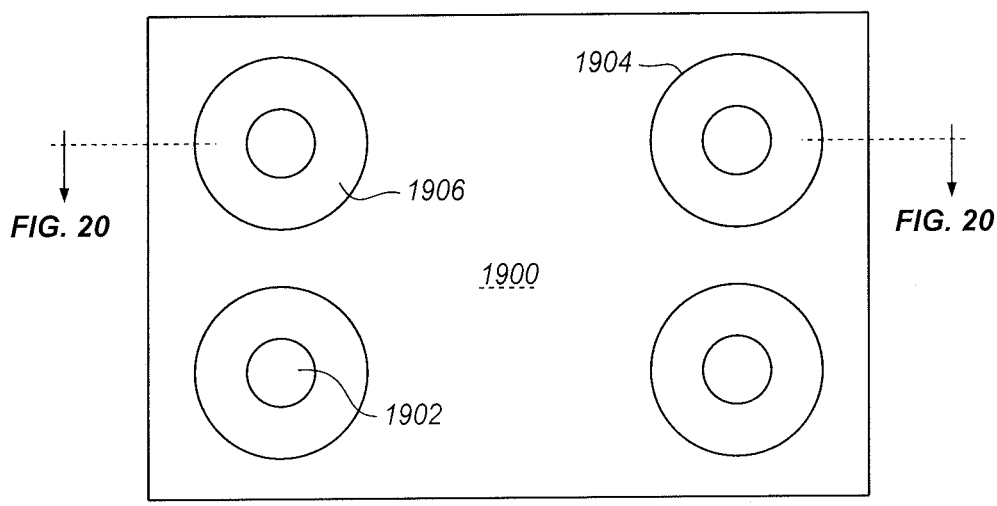
FIG. 19 shows a top view of a structured substrate with a plurality of apertures and membrane suspended optical elements.
Figure 20:
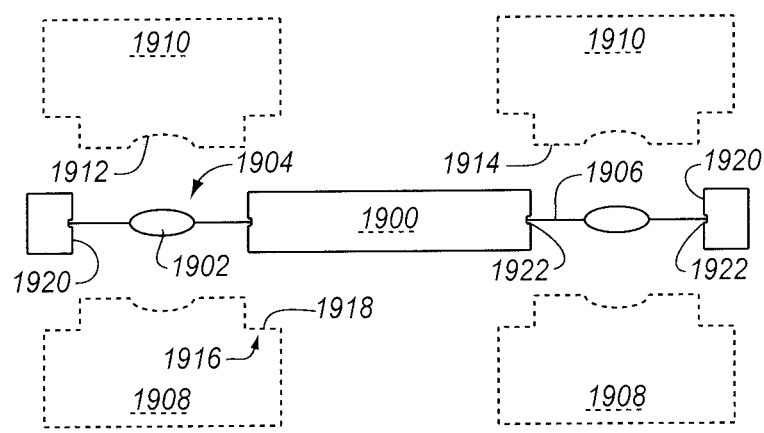
FIG. 20 shows a cross-sectional view through a segment of the structured substrate and membrane suspended optical elements of FIG. 19.

FIG. 19 illustratively shows a top view of a structured substrate 1900 with a plurality of membrane suspended optical elements 1902 within a like plurality of apertures 1904 formed in structured substrate 1900. FIG. 20 shows a cross-sectional view through structured substrate 1900 and two of the optical elements and apertures. FIG. 19 and FIG. 20 are best viewed together in the following description.

Four optical elements 1902 are shown in FIG. 19, though fewer and typically many more like optical elements are within structured substrate 1900. Each optical element 1902 is shown as a singlet, though each optical element may instead be a complex lens or layered optical element without departing from the scope hereof. Each optical element 1902 is suspended within an aperture 1904 by a membrane 1906. Membrane 1906 may be formed of the same optical material as optical element 1902. Although aperture 1904 is circularly shaped, aperture 1904 may instead be rectangular (including square-shaped), oval shaped or other arbitrary shape without departing from the scope hereof.

FIG. 20 also shows, in dotted outline, a plurality of fabrication pedestals 1908, 1910. Each fabrication pedestal includes an optical contour surface 1912, a membrane engagement surface 1914 and a shoulder 1916 with a substrate engagement surface 1918. As will be apparent in the description below, a pair of opposing fabrication pedestals 1908, 1910 cooperate together to form an optical element 1902, and its membrane 1906, within a single aperture 1904 according to the size and shape (including optical contour surfaces) of the opposing pair of fabrication pedestals 1908, 1910. Although a single pedestal pair 1908, 1910 can be used to form one optical element at a time, typically an array of fabrication pedestal pairs are wielded together (most often on or linked together via a common platform or substrate, e.g., such that pedestals 1908 couple together and pedestals 1910 separately couple together) to form a like array of optical elements, such that the array of optical elements is formed at one time; this array may be the entire array for a substrate or only part of the entire array. An inner surface 1920 of aperture 1904 may be modified with, for example, a surface treatment for promoting better adhesion of membrane 1906 thereto. Additionally, one or more retention features 1922 may be incorporated into inner surface 1920 to help secure membrane 1906 within aperture 1904.

Figure 1:
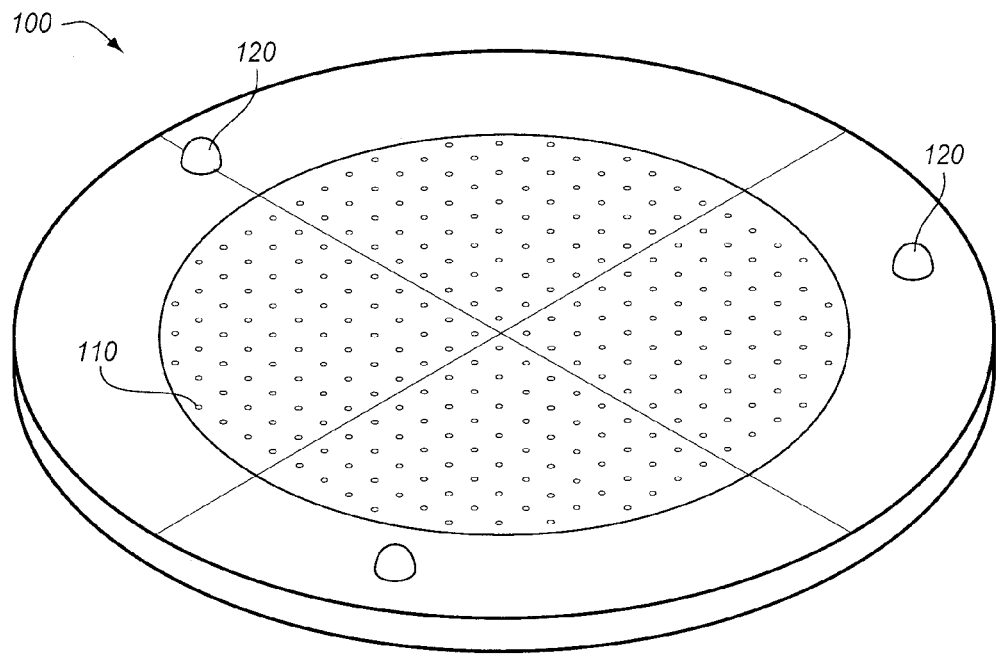
FIG. 1 shows an exemplary, precision-machined, fabrication master, including a plurality of features for forming optical elements therewith as well as a plurality of alignment features.
Figure 2:
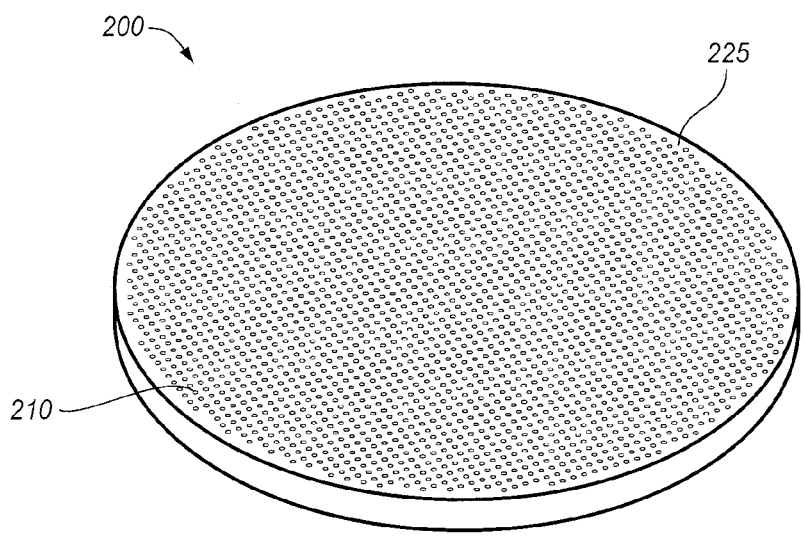
FIG. 2 shows an exemplary array of optical elements formed using a precision-machined, fabrication master.
Figure 3:
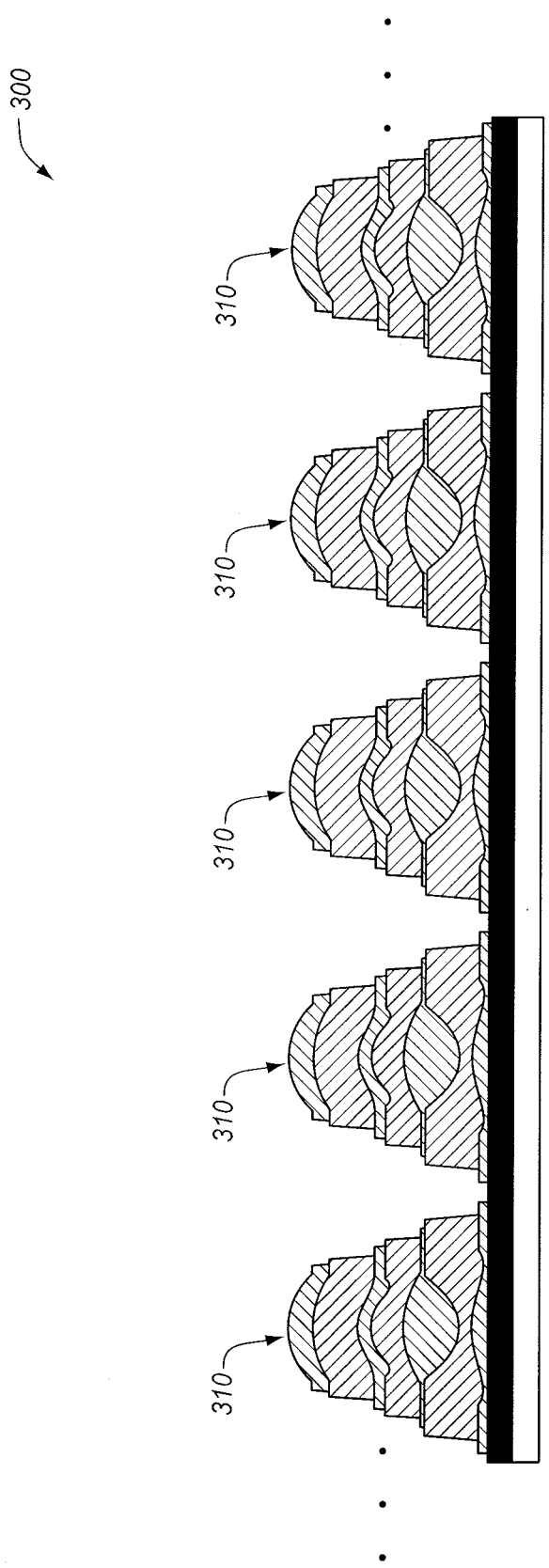
FIG. 3 shows an exemplary array of layered optical elements supported on a common base and formed using a plurality of precision-machined, fabrication masters.
Figure 4:
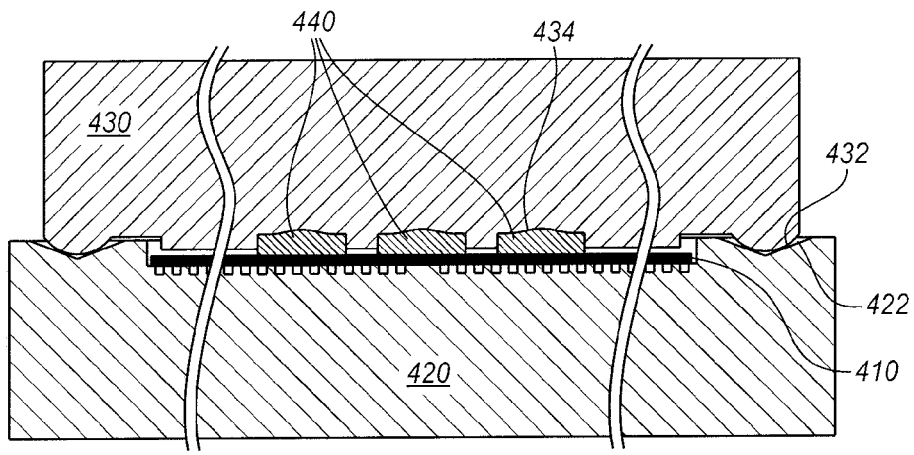
FIGS. 4-6 illustrate an exemplary method for forming an array of layered optical elements supported on a common base and formed using a plurality of precision-machined fabrication masters.
Figure 5:
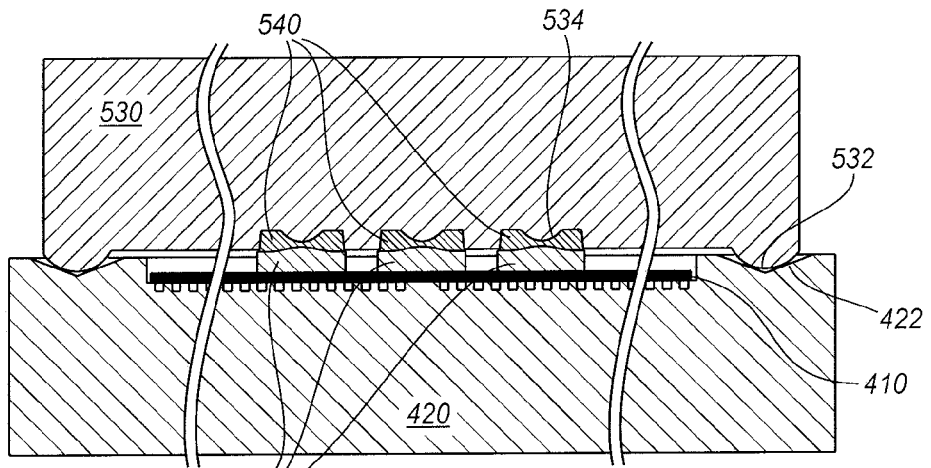
Figure 6:
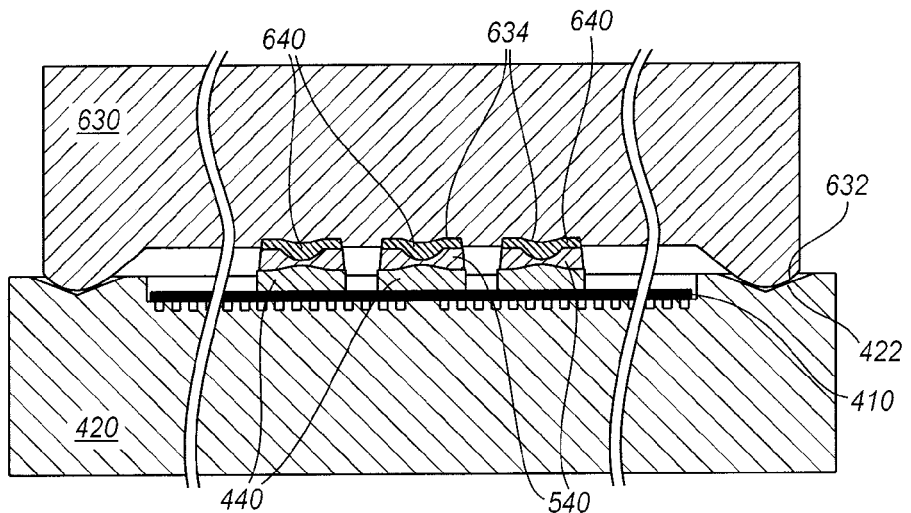
Figure 7:
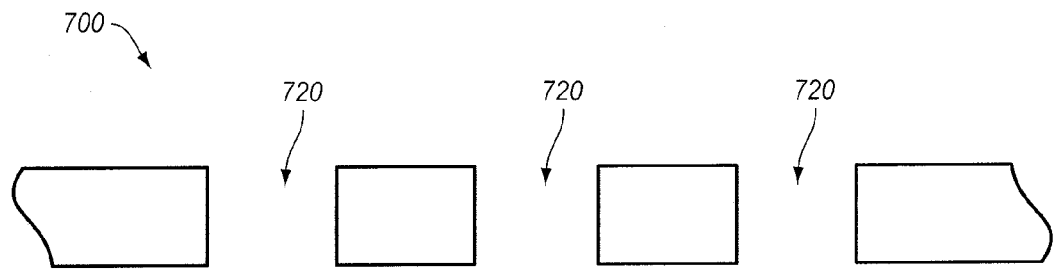
FIG. 7 shows a portion of an exemplary structured substrate, in accordance with an embodiment.

FIGS. 7-16 describe various embodiments of membrane suspended optical elements with structured substrates. In particular, FIG. 7 shows a cross-sectional view of one structured substrate 700 including a plurality of apertures 720 formed therethrough. Structured substrate 700 is for example a 300 micron-thick glass substrate and each aperture 720 is for example 2.5 millimeters in diameter. Such structured substrates are often used as a spacer for separating one substrate from another (not shown) while preserving clear access therebetween.

In accord with this disclosure, arrays of layered optical elements may be formed suspended, by membrane, within apertures of structured substrates. That is, single layer or multiple layer optical elements may be formed within the apertures of structured substrates in a membrane configuration to produce a plurality of optical elements integrated into apertures of the structured substrate.

Figure 8:
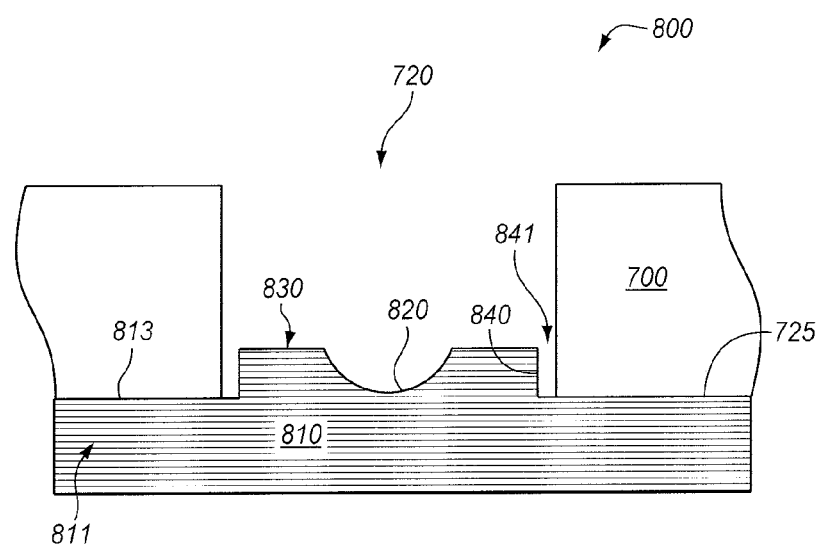
FIG. 8 shows a portion of a precision fabrication pedestal configured to cooperate with the exemplary structured substrate, in accordance with an embodiment.

Referring now to FIGS. 8-12, an exemplary process for forming an optical element, including one or more layers, within an aperture of a structured substrate is illustrated. In FIG. 8, a portion 800 of structured substrate 700 is shown mated with a first fabrication pedestal 810, only a part of which is shown here. First fabrication pedestal 810 includes a protrusion 830 having an optical contour surface 820, for defining an optical element therewith, and an overflow surface 840 (which, together with substrate 700, defines an overflow region 841, as described below). First fabrication pedestal 810 also includes a shoulder 811 with a substrate engagement surface 813. First fabrication pedestal 810 is configured to cooperate with structured substrate 700 such that the features (e.g., optical contour surface 820) for defining an optical element are positioned within one or more apertures in structured substrate 700 when engaged together. In the present example, engagement of first fabrication pedestal 810 with structured substrate 700 occurs by direct contact between substrate engagement surface 813 and a first side 725 of structured substrate 700.

Figure 9:
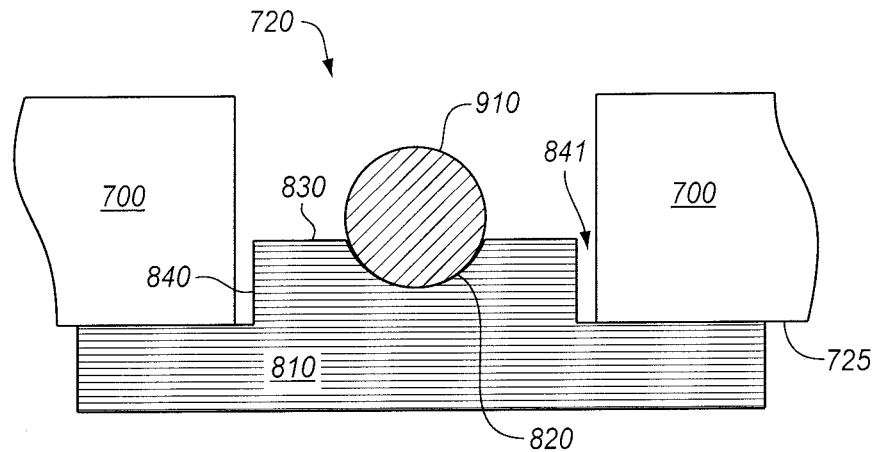
FIGS. 9-16 illustrate an exemplary method for forming an array of layered optical elements in a membrane configuration, in accordance with an embodiment.
Figure 10:
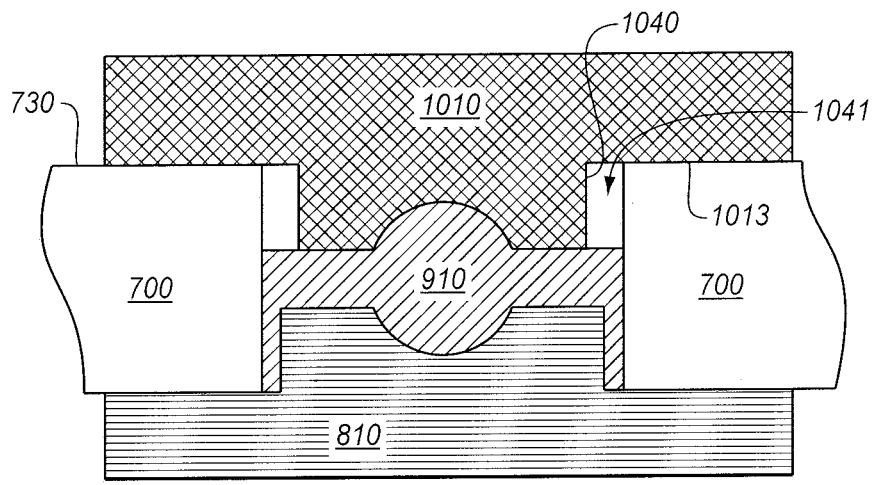

As shown in FIG. 9, a first optical material 910 is deposited onto first fabrication pedestal 810 engaged within aperture 720. Then, as shown in FIG. 10, a second fabrication pedestal 1010 is brought into engagement with structured substrate 700 (specifically, a shoulder engagement surface 1013 of fabrication pedestal 1010 is brought into contact with a second side 730 of structured substrate 700) so as to shape first optical material 910 in a controlled manner (i.e., when first optical material 910 is sandwiched between first fabrication pedestal 810 and second fabrication pedestal 1010). In an embodiment, excess amounts of first optical material 910 flows into overflow region 841 and into an overflow region 1041, which is defined between an overflow surface 1040 of second fabrication pedestal 1010 and structured substrate 700. First material 910 may then be hardened by an appropriate method such as, but not limited to, thermal curing (e.g., by application of heat) or UV curing (e.g., by using a transparent material (e.g., UV transmitting PDMS) as at least one of the first and second fabrication pedestals and applying UV light therethrough), to form a hardened optical element 1015 suspended by a membrane 1016.

Optical material 910 may instead be deposited first onto fabrication pedestal 1010 in an "upward dispense" configuration whereinafter fabrication pedestal 810 is engaged with structured substrate 700 to form optical material 910 before curing.

Overflow regions 841, 1041, for example, may influence overflow preferentially. That is, design of each pedestal 810, 1010, and overflow surfaces 840, 1040, respectively, may be configured to preferentially flow optical material into overflow regions 841, 1041 and usefully affect formation of stacks of optical elements.

Figure 11:
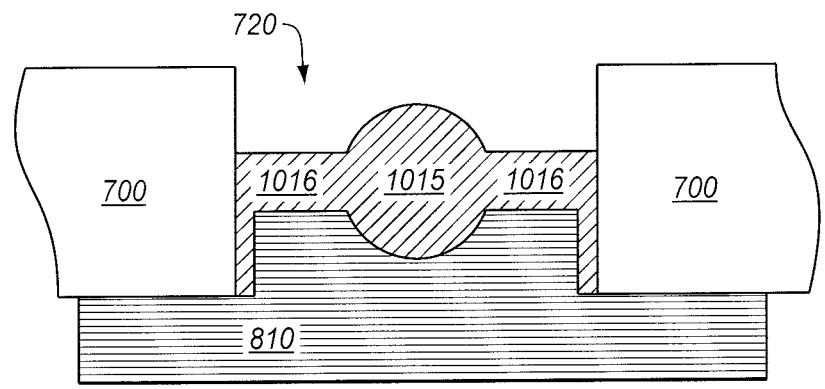
Figure 12:
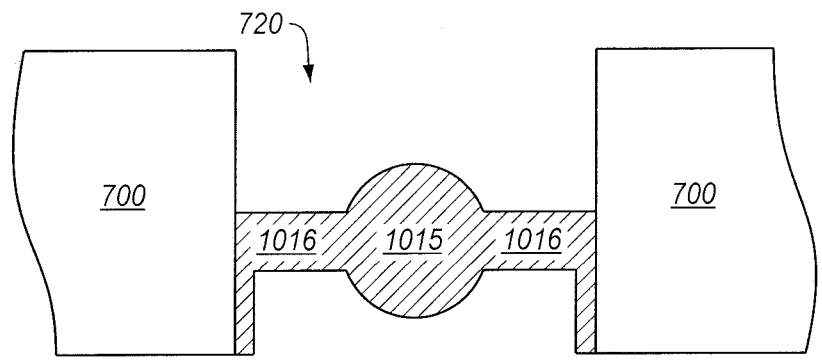

In the example shown in FIG. 11, second fabrication pedestal 1010 is removed to leave hardened optical element 1015 formed within aperture 720. Hardened optical element 1015 is attached to structured substrate 700 by membrane 1016, which corresponds to the amount of first optical material 910 that remained between first and second fabrication pedestals 810, 1010 and that overflowed into region 841 during processing described immediately above. As illustrated in FIG. 12, first fabrication pedestal 810 may be detached from optical element 1015 and membrane 1016 at this point such that a single optical element 1015 is suspended, by membrane 1016, within aperture 720, as shown in FIG. 12.

Figure 13:
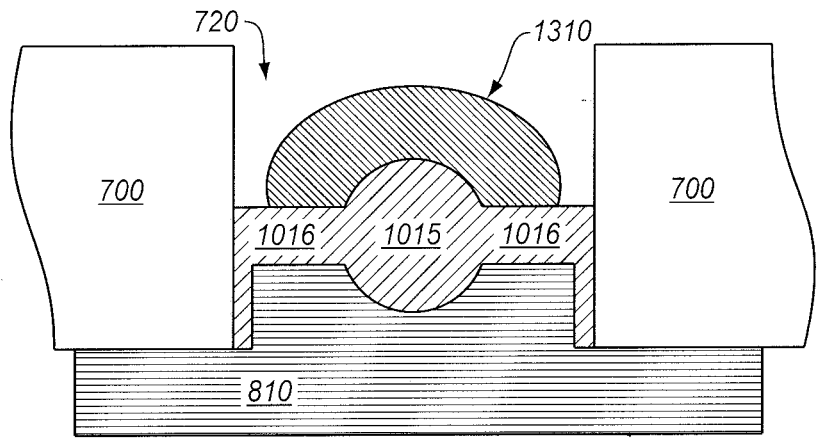
Figure 14:
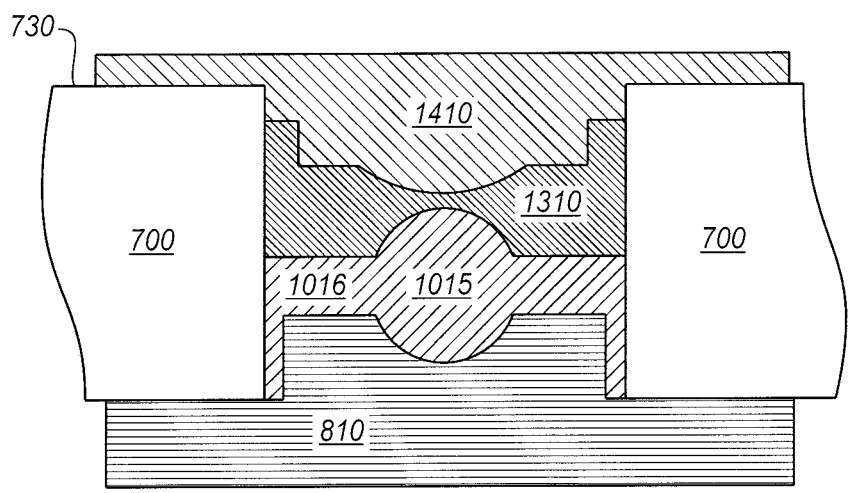
Figure 15:
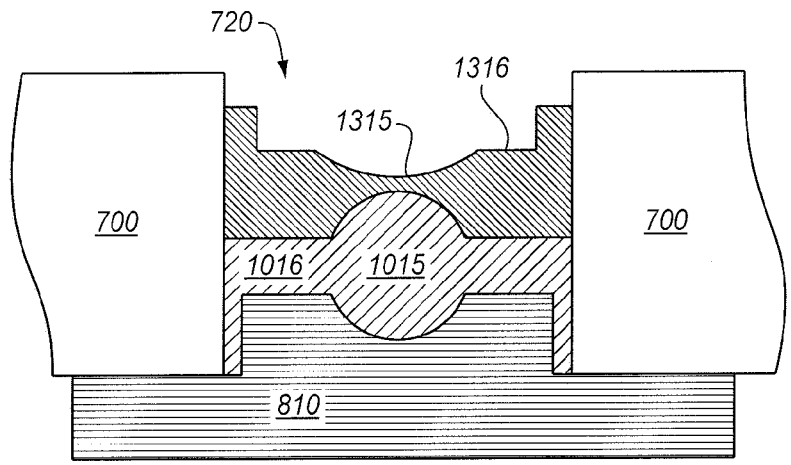
Figure 16:
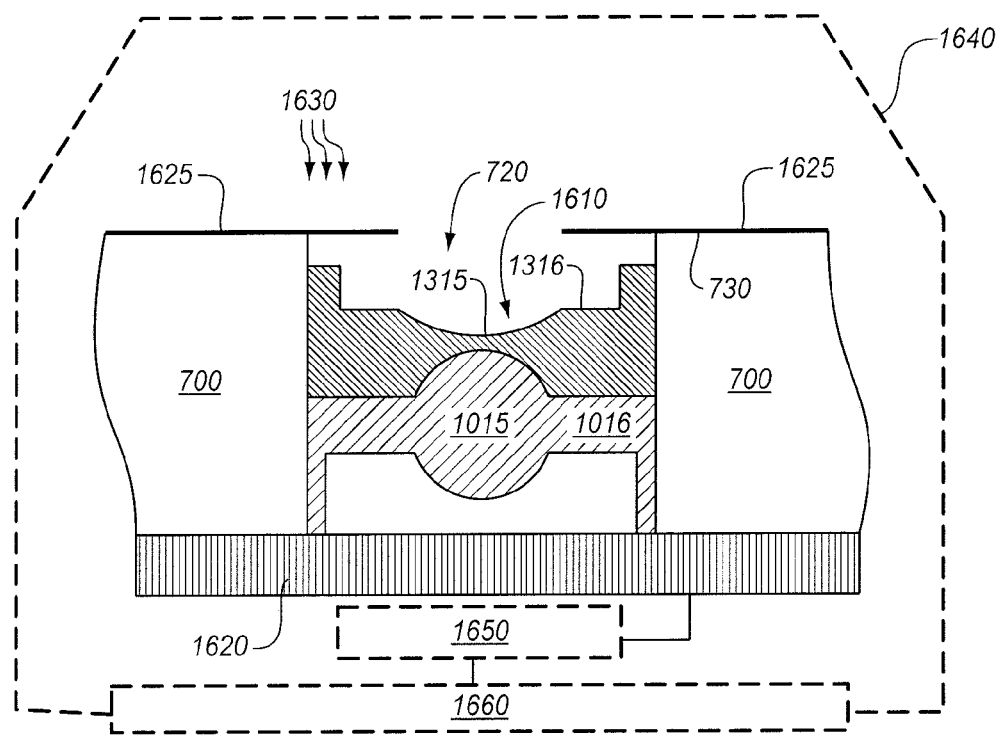

Alternatively, following the configuration illustrated in FIG. 11, a second optical material 1310 may be deposited onto optical element 1015 and membrane 1016 as shown in FIG. 13. A third fabrication pedestal 1410 may be brought into engagement with second side 730 and second optical material 1310, as shown in FIG. 14. Then, second optical material 1310 may be hardened by an appropriate method and third fabrication pedestal 1410 may be subsequently removed so as to form an optical element 1315 and membrane 1316, which also connects to structured substrate 700, as shown in FIG. 15. First fabrication pedestal 810 may then be detached from optical element 1015 and membrane 1016, as shown in FIG. 16, so as to result in the formation of two-layer optical elements 1610 suspended by membrane (i.e., membranes 1016 and 1316) within aperture 720. This process may continue to add further layers to layered optical element 1015, 1315.

It should be noted that second optical element 1315 (and membrane 1316) may be formed prior to optical element 1015 (and membrane 1016) without departing from the scope hereof, by reordering of steps outlined in FIGS. 7-14.

The membrane configuration thus described is particularly advantageous since it allows juxtaposition of structured substrate 700, and consequently optical elements within apertures 720, and another object, such as a sensor array 1620 (also shown in FIG. 16). That is, optical elements (e.g., optical element 1015, 1315) may be brought into very close proximity with another object (e.g., sensor 1620) while maintaining low tilt misalignment due to the high degree of flatness of structured substrate 700. One way to consider this membrane configuration is that it provides a contained structural equivalent of "lenses in a barrel" at a much smaller, wafer scale than is commonly associated with other "barrel" configurations in which, for example, a protective barrel is used to contain lens elements in a traditional, larger imaging system.

Another benefit of the membrane configuration such as shown in FIG. 16 is that a baffle 1625 (e.g., a metal foil) may used to prevent incident light 1630 from passing through membrane 1016/1316 and may be integrated with or onto structured substrate 700. Baffle 1625 is for example attached to second side 730 of structured substrate 700. Baffle 1625 thus may improve signal to noise ratios at sensor 1620 since stray light passing through membrane 1016/1316 may be at least partially blocked. In alternative embodiments, a baffle having similar function as baffle 1625 may be incorporated as follows:

Depositing a coating (e.g., a resist) over the substrate, membrane and optical element, then selectively removing the coating from the optical element;

Transferring a blocking material to non-optical areas (e.g., by contact printing); and/or Bonding an additional glass spacer wafer (e.g., with a patterned aperture applied thereon) to the structured substrate wafer, which would allow baffling of the overhang type shown in FIG. 16.

The configuration of FIG. 16 thus conveniently permits packaging of an optical module (formed of structured substrate 700, including optical elements 1015 and 1315 therein) and sensor 1620 into a camera assembly, shown as dotted outline 1640. A digital signal processor (shown in dotted outline 1650) may be connected with sensor 1620 to process image data from sensor 1620 to produce a human viewable image on an external display (shown as dotted outline 1660), as shown.

Figure 17:
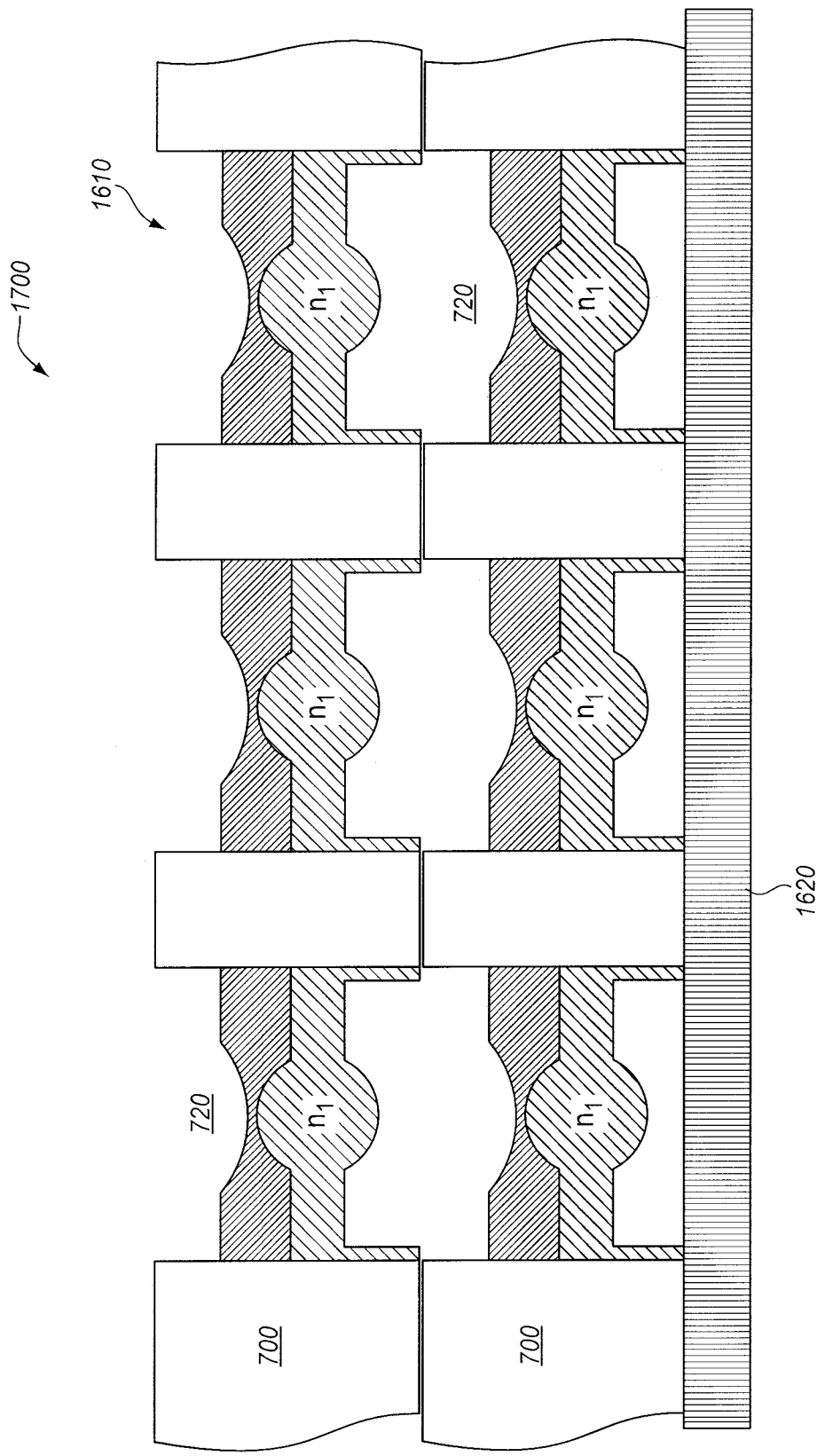
FIG. 17 shows a portion of two arrays of layered optical elements in membrane configurations, shown here to illustrate an arrangement in which the two arrays are stacked on top of each other and on a sensor array for precision z-axis alignment, in accordance with an embodiment.
Figure 18:
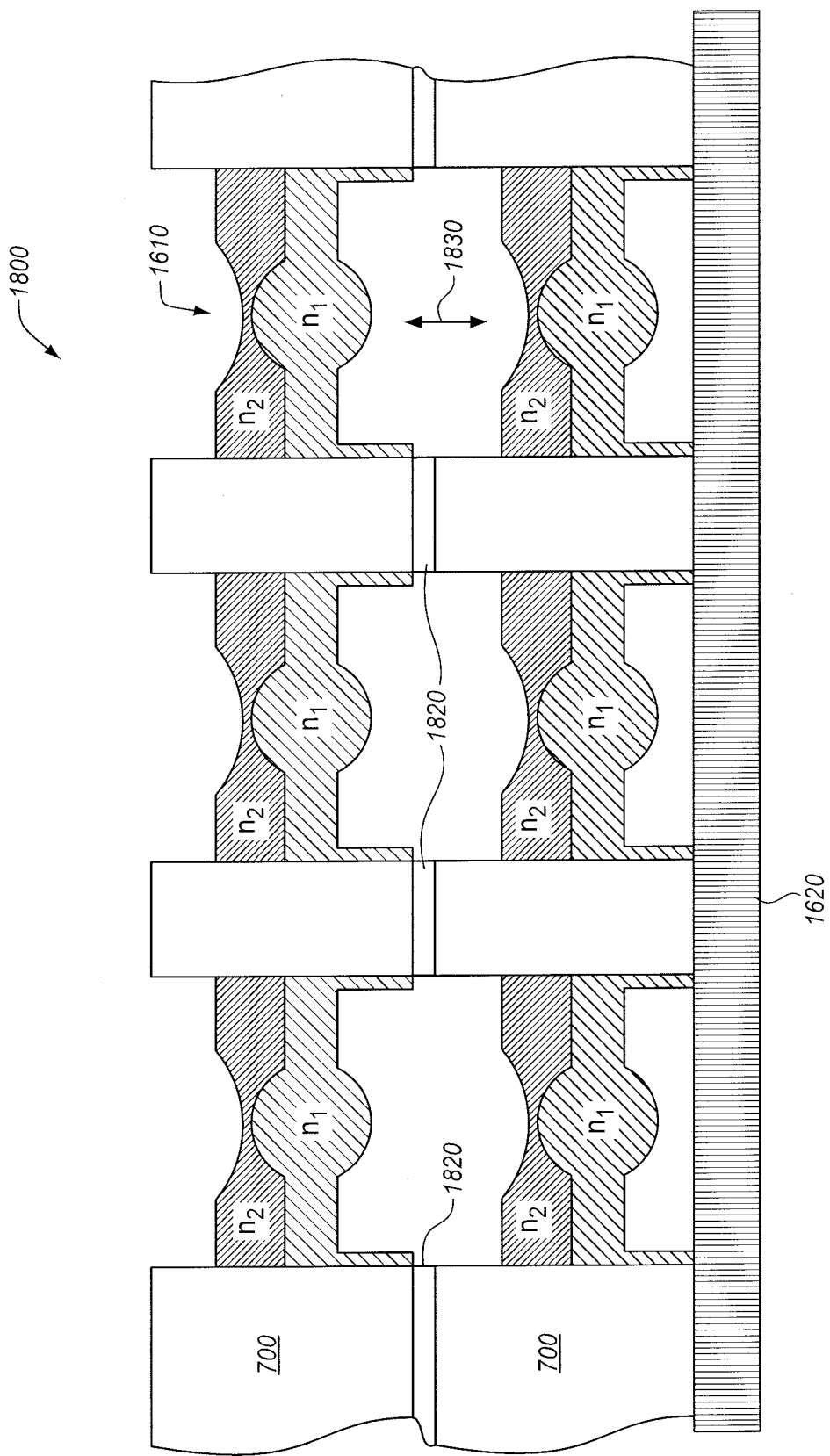
FIG. 18 shows a portion of two arrays of layered optical elements in membrane configurations, shown here to illustrate an arrangement in which the two arrays are stacked with an active layer disposed therebetween for adjustable z-axis alignment, in accordance with an embodiment.

Further modifications of the aforedescribed examples of arrayed optical elements are possible. For example, as shown in FIG. 17, two or more arrays of two-layered optical elements 1610 in a membrane configuration may be stacked together to form compound optical systems including air gaps therein or therebetween. As another example, as shown in FIG. 18, two or more arrays of two-layered optical elements 1610 may be stacked together but separated by an active layer 1820 so as to enable motion of the arrayed optical element with respect to each other (e.g., in a Z-direction as indicated by double-headed arrows 1830). Active layer 1820 may be formed of, for instance, a piezo-electric material, an elastomer, Electroactive Polymer Artificial Muscle (EPAM™) available from Artificial Muscle, Inc., a MEMS device or any other means of enabling Z and/or X-Y motion. In this case, the solid portions of the structured substrate may be formed at least partially of metal (or with use of metal leads through holes in the structured substrate) so as to provide electrical contact with active layer 1820. Still further, apertures of the structure substrates may be configured to facilitate containment of optical elements formed therein. For example, the structured substrate may be configured such that the aperture is thinner in the center than near the top and bottom surfaces of the structured substrate, which would make it difficult to pull out the material used to form the optical elements. If such a shaped aperture were used, for instance, it is more difficult to pull out the material forming the optical element from the top if the bottom of the aperture is filled with the material.

Though FIGS. 17 and 18 illustrate two distinct arrays of two-layer optical elements, such multiple arrays can instead include (a) single layer membrane-suspended optical elements (e.g., such as in FIG. 12) or (b) three or more layer membrane-suspended optical elements without departing from the scope hereof.

Figure 21:
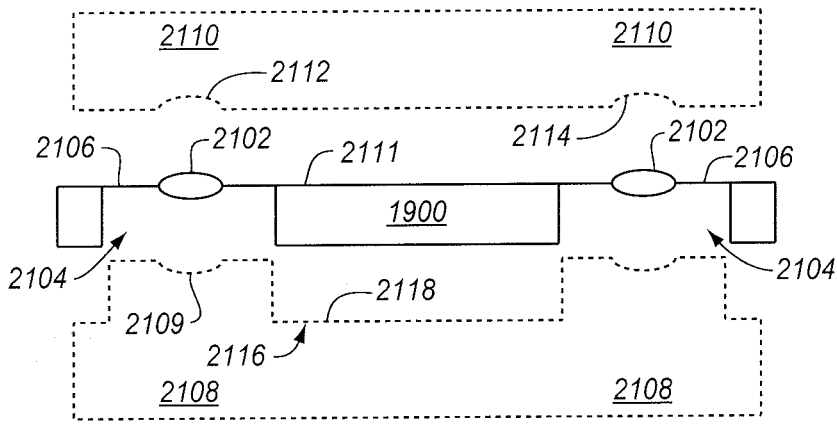
FIG. 21 shows a suspended lens protruding from an aperture of a structured substrate, in an embodiment.

In an alternative embodiment, one of the fabrication pedestals may be configured as a flat mold that does not fit inside the structured substrate. In this case, the resulting optical element may be suspended with or adjacent to the aperture of the structured substrate and be disposed flush to one side of the structured substrate. FIG. 21 shows such an embodiment of a suspended lens, in which the suspended lens protrudes from the aperture. As shown in FIG. 21, a fabrication pedestal 2108 is configured such that a first optical contour surface 2109 of fabrication pedestal 2108 is aligned at or near a top surface 2111 of structured substrate 1900 when engaged therewith. Complementarily, a fabrication master 2110 includes a second optical contour surface 2112, which is also aligned at or near top surface 2111 of structured substrate 1900 when engaged therewith. Fabrication pedestal 2108 and fabrication master 2110 are configured to cooperate with structured substrate 1900 so as to be capable of forming an optical element 2102 supported by a membrane 2106 within aperture 2104 and near top surface 2111. As may be seen in FIG. 21, optical element 2102 at least partially protrudes from aperture 2104 such that, for example, when structured substrate 1900 is brought into aligned contact with a second structured substrate with or without suspended lenses, optical element 2102 may be "nested" into the apertures (and, potentially, suspended lenses contained therein) of the second structured substrate.

Figure 22:
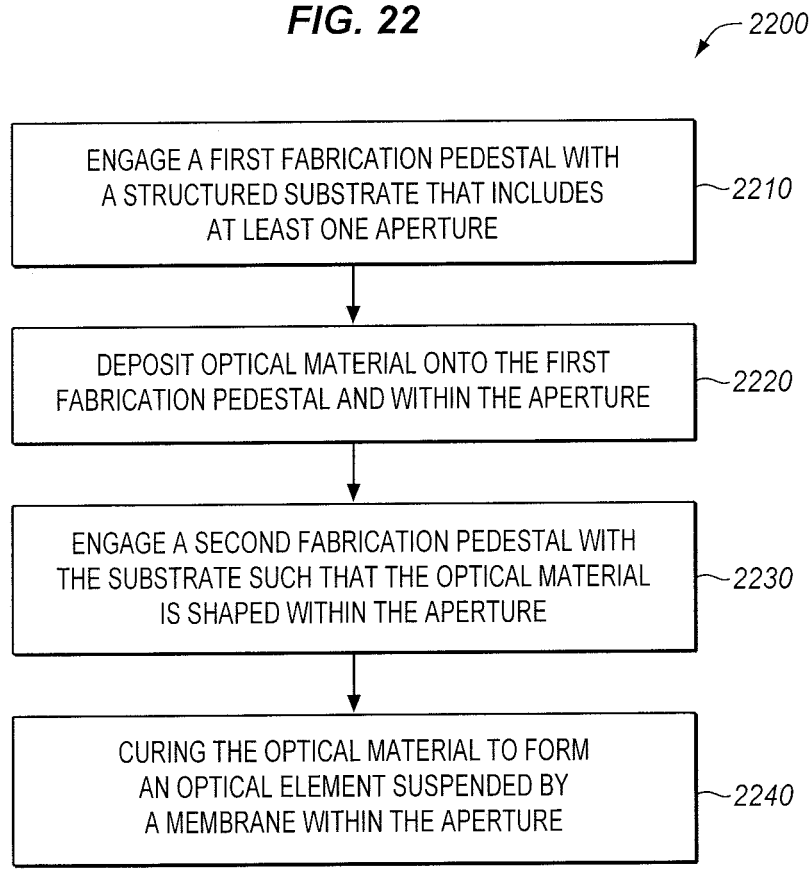
FIG. 22 shows a process of forming a suspended lens, in accord with an embodiment.

FIG. 22 shows one process 2200 of forming a suspended lens. In step 2210, a first fabrication pedestal is engaged with a structured substrate that includes at least one aperture therethrough. In step 2220, an optical material is deposited onto the first fabrication pedestal and within the aperture. In step 2230, a second fabrication pedestal is engaged with the substrate such that the optical material is shaped within the aperture. In step 2240, the optical material is cured to form an optical element suspended by a membrane within the aperture.

It is recognized herein that the membrane configuration as described above may provide a variety of advantages including, but not limited to:

Reducing or eliminating the need for spacer wafers;
Allowing arbitrary/adjustable positioning of the suspended lenses along the optical path (e.g., in Z-direction 1830, FIG. 18);
Enabling accurate Z positioning of the suspended lenses by using a direct substrate-to-master interface in the fabrication thereof;
Reducing or eliminating of electromagnetic energy transmission through one or more substrates in the optical path by the use of baffles;
Allowing the use of transparent, opaque, conductive and/or metallic structured substrate depending on desired characteristics and specific application;
Controlling thermal expansion of the optical elements;
Providing a moisture barrier to protect the optical elements; and/or
Eliminating the need for a coverglass between the optical elements and the sensor.

Additionally, compared with existing layered lens structures, in which optical elements are directly stacked on top of each other and supported on a substrate, each lens in the membrane configuration allows for two air-to-polymer interfaces. Consequently, the refractive index differences at each interface is increased, providing further flexibility in the optical design.

Figure 23:
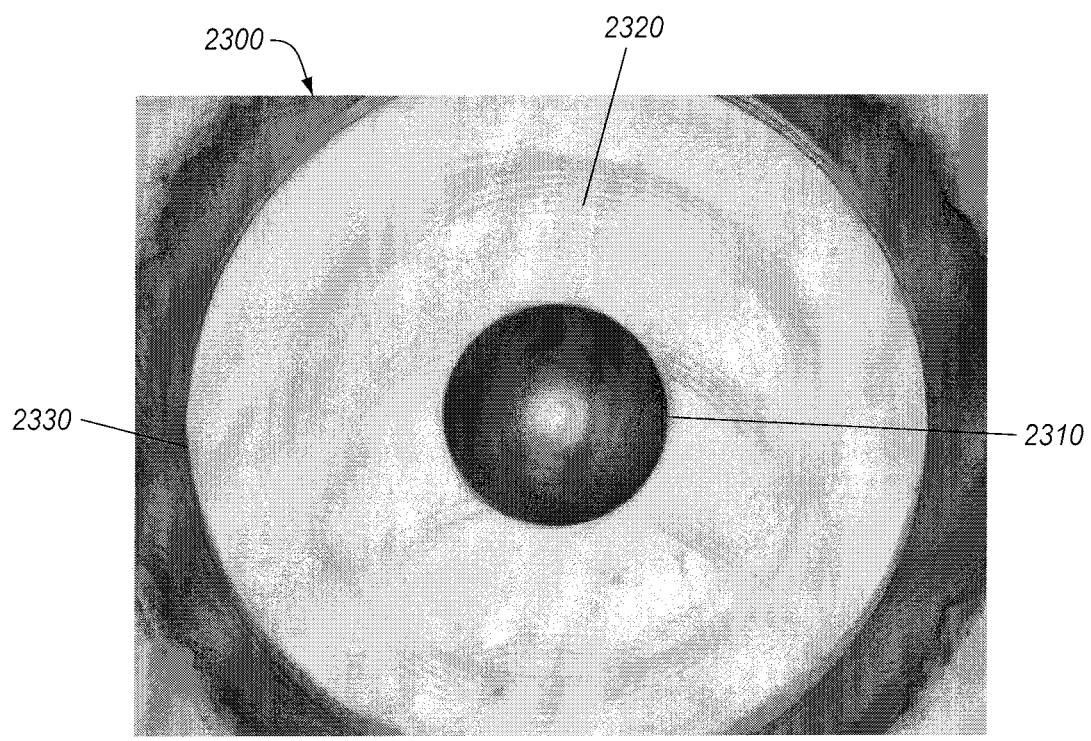
FIG. 23 shows experimental results constructing one exemplary membrane suspended lens.

FIG. 23 shows a digital microscope image 2300 of an optical element 2310 (0.6 mm diameter) suspended by membrane 2320 (2 mm diameter) within an aperture 2330. Optical element 2310 and membrane 2320 were fabricated according to the following exemplary procedure:
1. Dispense an optical adhesive (such as a commercially-available UV curable adhesive) onto fabrication pedestals coupled with structured substrate with the aperture;
2. Expose the optical adhesive for 120 seconds with a 600 Watt UV flood source; and
3. Anneal the optical adhesive for three hours at 150° C. in air to achieve a full cure;

Measurement of the surface of optical element 2310 indicates a uniform spherical shape with the apex of element 2310 being located approximately 45 μm above the plane of membrane 2320. The diameter of optical element 2310 is approximately 30% of the diameter of aperture 2330, which provides ample clear aperture to transmit sufficient electromagnetic energy therethrough.

The changes described above, and others, may be made in the imaging system described herein without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. Membrane suspended optical elements, comprising:
a substrate including a plurality of apertures therethrough; and
an array of membranes and first optical elements, wherein
each of the membranes is formed with one of the first optical elements from flowable material that is subsequently cured such that each of the first optical elements is surrounded and suspended by membrane within one of the apertures,
the flowable material forms a cured flowable material after it is subsequently cured, and
each of the apertures comprises an overflow region adjacent to an inner surface thereof, and the membranes and first optical elements are integrally formed with a portion of the cured flowable material in the overflow region.

2. Membrane suspended optical elements of claim 1, wherein all of the first optical elements are identical.

3. Membrane suspended optical elements of claim 1, wherein each of the apertures is rectangularly-shaped, oval-shaped, or circularly-shaped.

4. Membrane suspended optical elements of claim 1, further comprising a metal baffle that is attached to one side of the substrate, and that forms apertures that align with the apertures of the substrate, to block stray light through the membrane.

5. Membrane suspended optical elements of claim 1, further comprising an array of second optical elements, each of the second optical elements being surrounded and suspended by membrane within one of the apertures.

6. Membrane suspended optical elements of claim 5, wherein first and second optical elements of each aperture are in contact, being free of space therebetween.

7. Membrane suspended optical elements of claim 6, wherein the substrate comprises at least a first substrate and a second substrate mechanically coupled together, the first substrate having the first optical elements within apertures thereof and the second substrate having the second optical elements within apertures thereof, the first and second substrates being coupled such that respective apertures of the first and second substrates align with one another.

8. Membrane suspended optical elements of claim 7, further comprising an active layer between the first and second substrates, to vary optical spacing between the first and second optical elements.

9. Membrane suspended optical elements of claim 8, wherein the active layer comprises one of a piezo-electric material, an elastomer and a MEMS device.

10. Membrane suspended optical elements of claim 5, wherein first and second optical elements of each aperture are not in contact.

11. Membrane suspended optical elements of claim 1, wherein each of the apertures is circularly-shaped, and wherein a diameter of each of the first optical elements is less than a diameter of each of the apertures.

12. Membrane suspended optical elements of claim 1, wherein the substrate is a spacer wafer comprising one of glass, silicon and sapphire.

13. Membrane suspended optical elements of claim 12, wherein the apertures extend through the spacer wafer such that fabrication pedestals can extend into the apertures from either side or both sides of the spacer wafer.

14. Membrane suspended optical elements of claim 1, further comprising a sensor packaged with each of the optical elements, such that each optical element and sensor forms a camera assembly.

15. Membrane suspended optical elements of claim 1, wherein an inner surface of each of the apertures forms a retention feature for securing the membrane within the aperture.

16. Membrane suspended optical elements of claim 1, wherein the overflow region is laterally bounded by an overflow surface of a fabrication pedestal and by the inner surface of the aperture.

* * * * *